(No Model.) 4 Sheets—Sheet 2.
L. HOUZE.
ROASTING AND CALCINING KILN.
No. 519,063. Patented May 1, 1894.
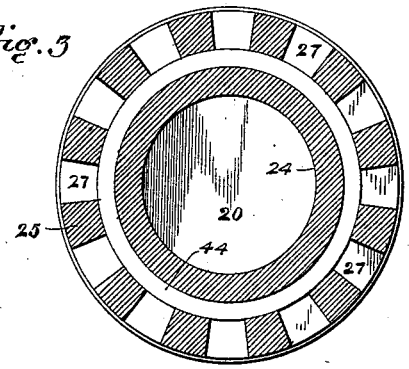
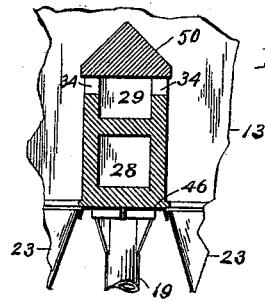
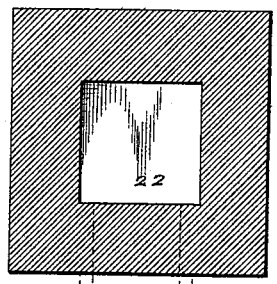
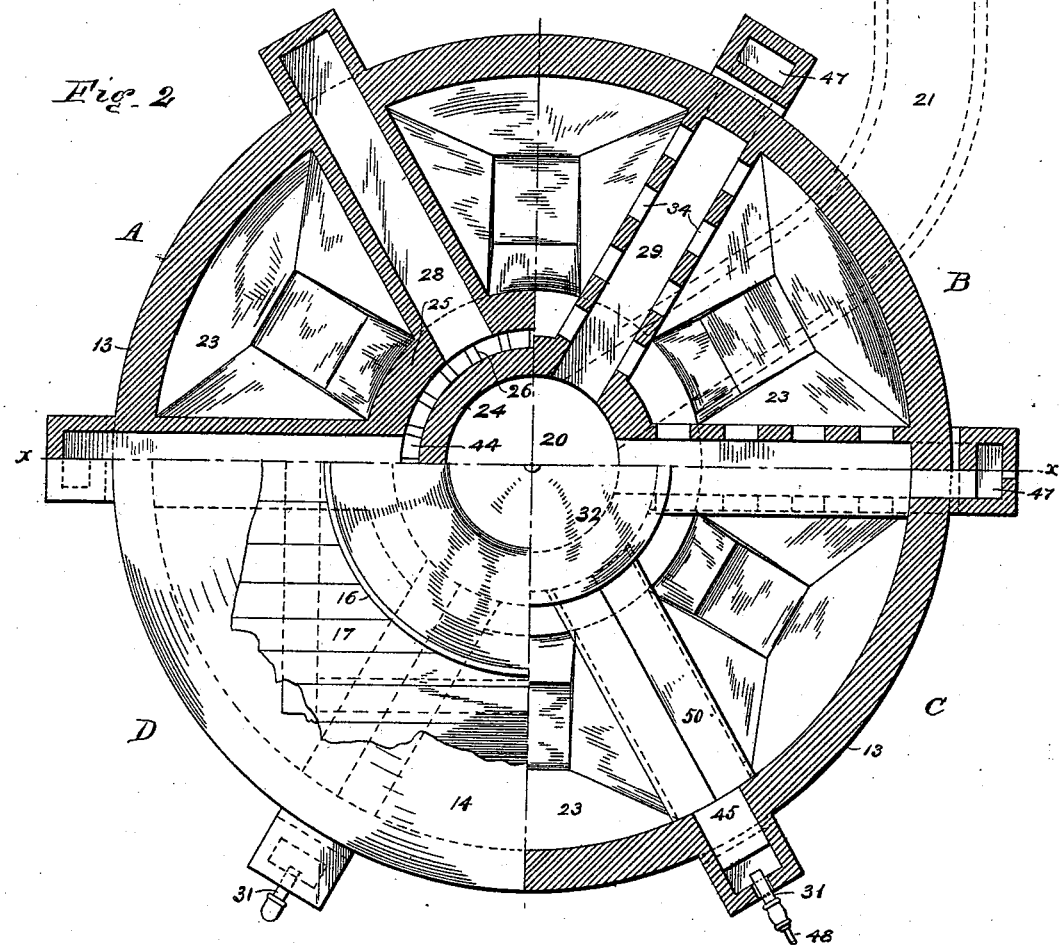
WITNESSES:
W. T. Hulse
E. C. Coolican
Luke Houze INVENTOR
BY
H. C. Hartman
ATTORNEY.

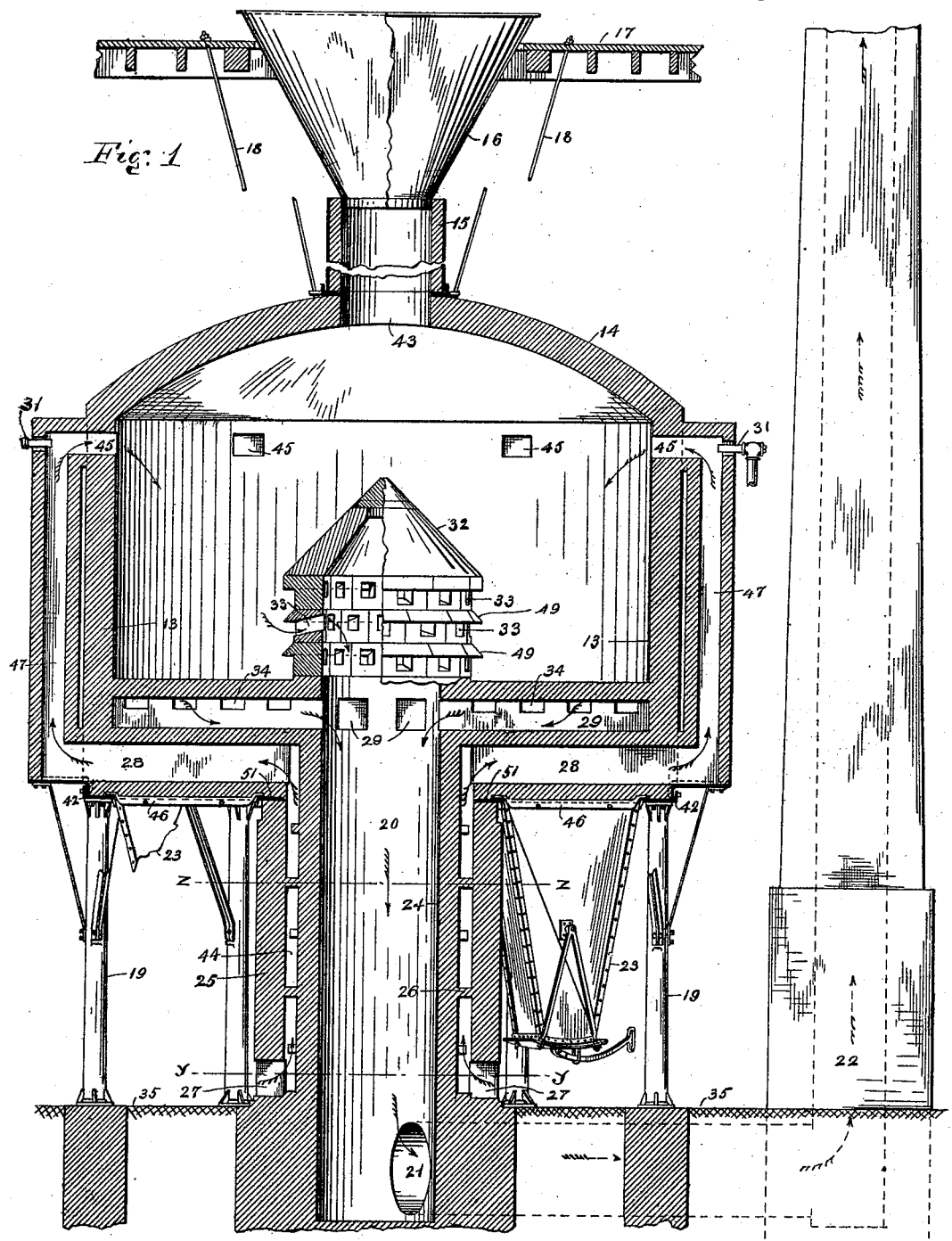

(No Model.) 4 Sheets—Sheet 3.

L. HOUZE.
ROASTING AND CALCINING KILN.

No. 519,063. Patented May 1, 1894.

WITNESSES:
W. S. Hulse
E. C. Coolican

INVENTOR:
Luke Houze

BY
H. C. Hartman
ATTORNEYS.

(No Model.) 4 Sheets—Sheet 4.
L. HOUZE.
ROASTING AND CALCINING KILN.

No. 519,063. Patented May 1, 1894.

WITNESSES:
W. S. Hulse
E. C. Coolican.

INVENTOR
Luke Houze
BY
H. C. Hartman
ATTORNEY.

UNITED STATES PATENT OFFICE.

LUKE HOUZE, OF MONTPELIER, INDIANA.

ROASTING AND CALCINING KILN.

SPECIFICATION forming part of Letters Patent No. 519,063, dated May 1, 1894.

Application filed November 6, 1893. Serial No. 490,107. (No model.)

*To all whom it may concern:*

Be it known that I, LUKE HOUZE, a citizen of the United States, residing at Montpelier, in the county of Blackford, in the State of Indiana, have invented certain new and useful Improvements in Roasting and Calcining Kilns; and I do hereby declare that the following is a full, clear, and exact description of the invention, which will enable others skilled in the art to which it appertains to make and use the same, reference being had to the accompanying drawings, which form part of this specification.

My invention relates to that class of kilns which are used for calcining or roasting limestone in the manufacture of lime, cement, and other materials requiring similar treatment.

Its objects are, first, to provide an improved construction and combination of parts which will allow the filling or charging to be done at the top of the kiln, and the removal of the lime from the bottom continuously during operation: second, to provide improved means for creating and directing a blast of hot air to be mingled with the combustible gases as they enter the kiln: third, to provide an improved deflector whereby the contents of the kiln are prevented from clogging the down draft flue and are directed to the discharge bins: fourth, to provide improved discharge bins from which the manufactured lime or roasted material may be removed continuously: and fifth, to provide an improved down shaft to carry off the product of combustion.

Other objects will appear from the description. And the invention consists in the construction and novel combination of parts hereinafter described, pointed out in the appended claims, and illustrated in the accompanying drawings, in which—

Figure 5:
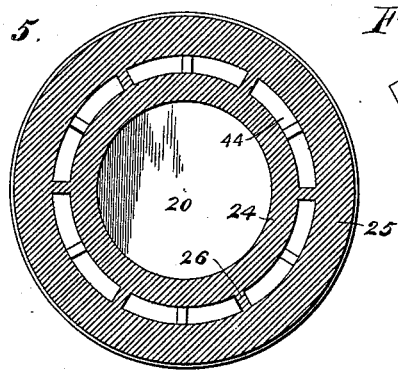
Figure 6:
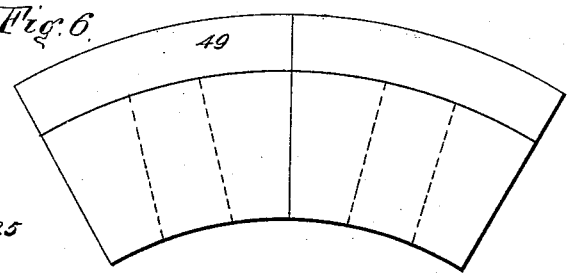
Figure 7:
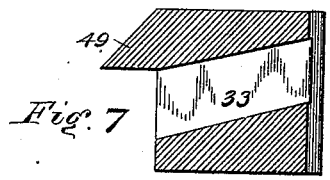
Figure 10:
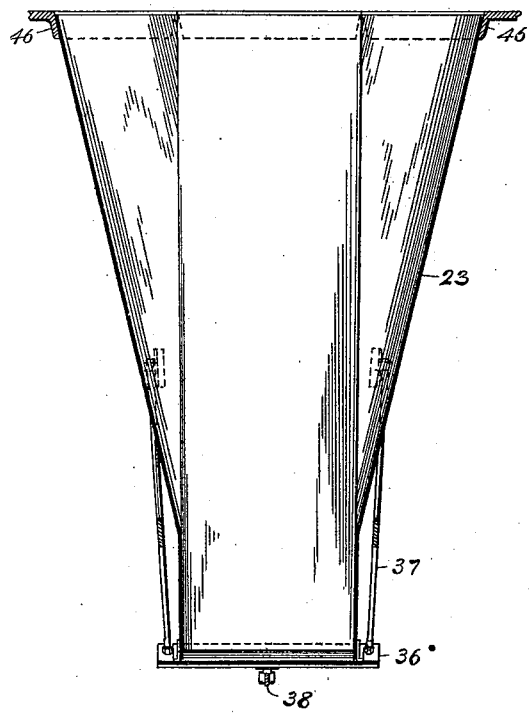
Figure 9:
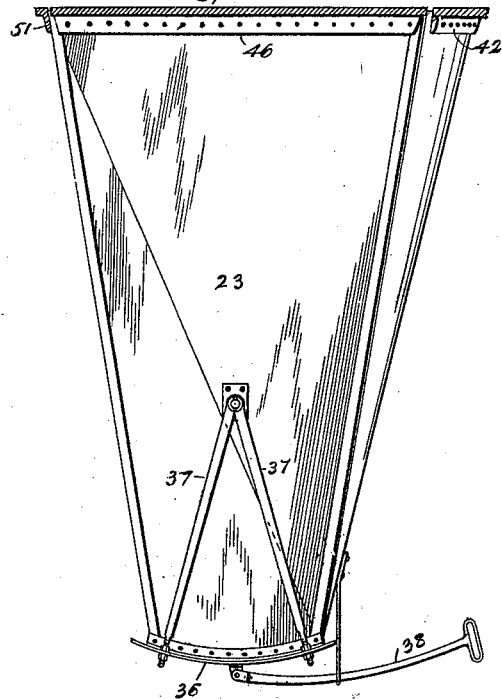
Figure 8:
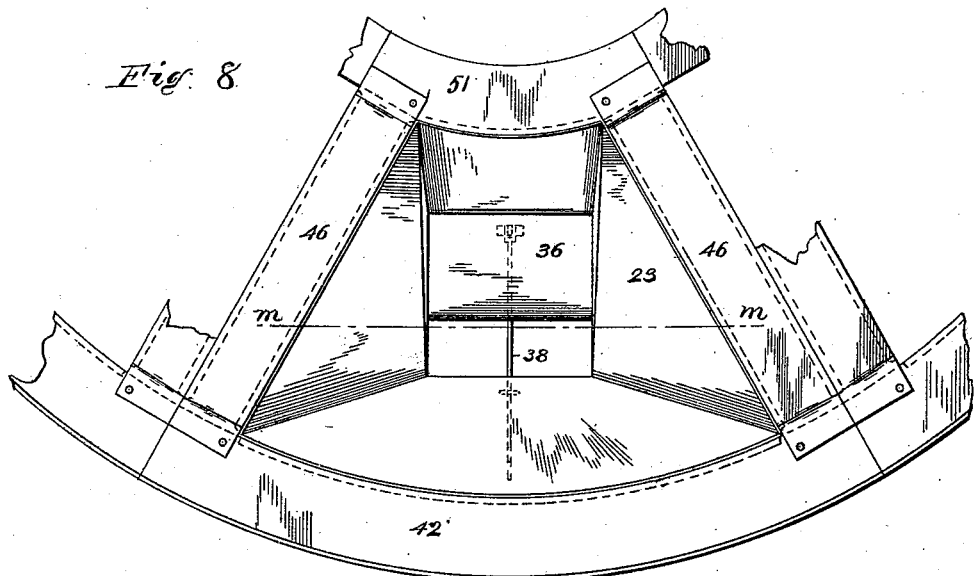

Figure 1 is a vertical section through the kiln on the line $x$—$x$ of Fig. 2. Fig. 2 is a horizontal section taken through four planes, viz: quadrant A taken through the center of the horizontal heating flue: quadrant B is taken through the horizontal down draft flue: quadrant C is taken through the combustion flue where it enters the kiln—and quadrant D is a top view taken above the hopper. Fig. 3 is a horizontal section taken through the line $y$—$y$ of Fig. 1. Fig. 4 is a vertical section of the horizontal down draft flue and the horizontal heating flue. Fig. 5 is a horizontal section taken through the line $z$—$z$ of Fig. 1. Fig. 6 is a plan view of the brick construction of the inlets to vertical down draft flue. Fig. 7 is a vertical section of Fig. 6 showing the inlet flues to the vertical down draft flue. Fig. 8 is a plan view of the improved hopper into which the products of the kiln fall, showing its attachment to the frame of the kiln. Fig. 9 is a side elevation of the improved hopper, and Fig. 10 is a vertical section taken through the line $m$—$m$ of Fig. 8.

Referring to the drawings by numerals, the preferable construction is: The kiln proper, that is, that part in which the burning or roasting of the materials takes place, is constructed with a vertical circular wall 13 built on a circular metallic rim 42 which is supported above the ground or floor 35 on suitable foundations, preferably iron columns 19. The wall 13 is surmounted by an arched roof or cover 14 which is provided with a central opening 43 for charging the kiln. Above this opening 43 is placed a charging flue 15 provided with a hopper 16 which passes through an upper floor 17 from which it is filled. Suspension rods 18 support this flue and hopper from the upper floor 17 to protect the roof 14 from their weight. A central supporting column is built from a point sufficiently below to admit of the entrance below the ground or floor 35 of the horizontal draft flue 21 which connects the vertical down draft flue 20 with the stack 22 placed outside of the kiln. The walls of the central column are double, the inner one 24 forming the flue 20 for the waste products of combustion and the outer one 25 is so built as to form an annular heating flue 44 around the inner wall 24, which flue is subdivided by fire brick 26 arranged in checkered form similar to the Siemens furnace, to assist in heating the cold air which enters this flue through openings 27 at the bottom just above the floor 35. As many iron columns 19 may be used as required.

Having determined the number and location of openings 45 where natural or artificial gas shall enter the kiln for combustion, a column 19 is placed in vertical line under each of such locations, and horizontal plates 46 are placed radially therefrom and supported in place, with one end on the wall 25 of the central column, and the outer end by the columns 19, which outer end is extended beyond the columns to support the outside vertical flue 47. These horizontal plates 46 sub-divide the open bottom of the kiln into suitable spaces for convenient discharge, which is their primary purpose, or function. Upon each of these radial plates 46 I build horizontal heating flues 28 communicating with the annular heating flue. This is a preferable location for the heating flues, whereby such heating is had from the heat generated within the kiln. The outside vertical flues 47 extend upward to the top of the wall 13 of the kiln and then pass into it forming the said openings 45.

The system of down draft flues consist of especial construction combined with the down draft flue 20. The first and principal one is the extension of the inner wall 24 up inside the center of the kiln proper, preferably one-third its height and surmounting it with a deflector 32 which covers the draft flue 20 and deflects (by reason of its inclined or conical upper surface and projection thereof beyond the wall 24) all materials outside the inlets 33 immediately under it. Underneath this deflector 32 are a series of inlets 33 to the down draft flue 29 arranged to admit the waste products of combustion, but to exclude the entrance of the materials or products of the kiln. Another important function of this construction is, the materials are deflected from the center of the kiln toward the hoppers, which creates such a movement of the mass that the descent into the hoppers is uniform and no part of the calcined material remains exposed to the calcining heat longer than is necessary. This is the essential point in the manufacture of lime to burn it just long enough to thoroughly calcine it, and to burn it uniformly.

The method of forming the inlets 33 is to provide them with projecting covers 49 to divert materials and to prevent them from entering the flue 20 as shown particularly in Figs. 6 and 7. It consists in making a projecting roof 49 having an angle adapted to deflect the materials from the inlets 33. These inlets are placed all along from the deflector 32 to the horizontal down draft flue 29 for the purpose of distributing the currents of the combustible gases throughout the kiln, so as to thoroughly subject all the materials thereto within a given area. To further aid such distribution, I build upon the horizontal heating flues 28 radial horizontal down draft flues 29 extended from the wall 13 of the kiln to and communicating with the down draft flue 20, and I arrange along their upper sides inlets 34 thereto. The tops of these flues 29 are provided with roofs 50, Fig. 4, having sufficient pitch to deflect readily all material falling on them.

It will be seen on inspection of drawings and from the description that the operation of burning or roasting takes place within the kiln above the horizontal flues 29.

To receive and discharge the manufactured products I construct and attach to the bottom of the kiln suitable hoppers 23. My preferable construction is shown in the drawings, Figs. 8, 9 and 10. It consists in making the hoppers of sheet metal substantially in the form shown. The upper ends of the hoppers flare outwardly so that their horizontally turned edges shall rest upon and be secured to the circular rim 42, plates 46, and plates 51 (forming supports on the wall 25 of the central column) whereby the hoppers form funnels, as it were, to the openings formed to the bottom of the kiln by the circular wall 25, the radial plates 46 and the outer wall 13 of the kiln. Below this the sides of the hoppers 23 are drawn in so that they form a rectangular opening at their bottoms, with pyramidical sides for a short distance above. The bottom of this hopper 23 is cut out circularly on two sides to accommodate it to a swinging cover or plate 36, which is held in place by the rods 37 pivoted to the sides of the hopper. This swinging cover is made about three inches larger than the bottom openings in all directions, so that when closed there shall be a three inch ledge all around outside the hopper on which to place sand or other material to seal the joint from the entrance of air into the hopper. The cover or plate 36 is provided with a handle 38 by which it is opened or closed. The purpose is to prevent any slaking of the lime while it is cooling in the hoppers.

This kiln is especially adapted to and is intended for the use of gas as a fuel. Natural gas is preferred when it can be had conveniently.

The complete kiln as shown and described is a down draft kiln of such large dimensions as to require separate discharge openings at the bottom with separate hoppers to each opening. But it is obvious that parts of the invention, and some of the combinations may be used with a kiln having a single discharge hopper, and may also be applied to an up draft kiln with advantage. But the full benefits of my invention are best obtained by the preferred construction shown in the drawings and described herein.

The operation is as follows: The kiln is filled through the charging hopper and flue and the gas is ignited at the point where it enters the kiln, and the air passing into the kiln through the outward vertical flues is mingled with the gas as it enters, greatly increasing the combustion, and the pressure of the gas greatly aiding the draft into the kiln. The draft is directed to the inlets 33 and 34, and as the combustible gases and air thus pass through the materials, they are thereby thoroughly subjected to such currents and are thoroughly burned. The stone below the lines of these currents is gradually removed through the hoppers until the manufactured lime from above fills them. At the same time there is a continual charging of the kiln through the charging hopper above. The material is fed into the hopper above and the manufactured lime taken out of the lower hoppers continuously. When in continuous operation the cold air enters the inlets 27 into the annular draft flue formed between the two walls of the central column and ascends up into the horizontal flues 28, thence outside into the vertical flues 47 and up to the opening 45, mingling with the ignited gases entering through the pipes 31 and thence over into the kiln as shown by the arrows, Fig. 1. And then the currents of combustion deflect through the material toward the inlets 33 of the central down draft flue and also toward the inlets 34 of the horizontal down draft flue, through which the waste gases pass into the down draft flue 20 and thence into the horizontal flue 21 and thence into the smoke stack 22 to the outside air. The flame has its greatest action on the sides of the conical mass of material, and, as the material descends, the added material fed from above falls on top of it rolling down over it, so that each particle is thoroughly subjected to such action, producing a uniformity of treatment not attained in any other calcining kiln.

Having thus described my invention, what I claim as new is—

1. In a calcining and roasting kiln, a kiln supported above the floor so as to provide space beneath for discharge bins or hoppers, and provided with a charging flue placed above the entrance for the combustible gases: a central down draft flue extended from the foundations up within the kiln proper about one-third its height and provided with inlets, and its lower end connected with and communicating through a horizontal flue to a stack: a deflector or cap for said down draft flue adapted to prevent the entrance of materials and deflect them past its said inlets: radial plates extended horizontally from the bottom of the walls of said kiln to the wall of said central down draft flue sub-dividing the open bottom of the kiln into convenient spaces for separate discharge: heating flues for air placed horizontally and radially at the bottom of the kiln and communicating through the flues or pipes with the gas entrance flue of the kiln, whereby air heated therein is fed to and mingles with the ignited gas at or near its entrance into the kiln: a heating flue space for air formed around said central down draft flue, provided with openings for outside air near the floor, and communicating at its upper end with the horizontal heating flues: horizontal down draft flues placed radially at or near the bottom of the kiln, each provided with a series of inlets protected by deflecting covers and communicating with the central down draft flue: bins or hopper their upper ends flaring outwardly so as to fit in and be attached to the constructions forming said spaces in the bottom of the kiln for separate discharge, and extended downward so as to form narrower openings of regular form at their lower ends: covers or plates for the lower ends of said hoppers adapted to open and close their openings and to furnish a ledge outside of such ends upon which sand or other material may be placed for sealing the joint: and a gas producing furnace adapted to discharge gas into the kiln.

2. In a calcining and roasting kiln, a kiln supported above the floor so as to provide space beneath for discharge bins or hoppers, and provided with a charging flue placed above the entrance for the combustible gases: a central down draft flue extended from the foundations up within the kiln proper about one-third its height and provided with inlets, and its lower end connected with and communicating through a horizontal flue to a stack: radial plates extended horizontally from the bottom of the walls of said kiln to the wall of said central down draft flue subdividing the annular open bottom of the kiln into convenient spaces for separate discharge: heating flues placed horizontally and radially at the bottom of the kiln and communicating through other flues or pipes with the gas entrance flue of the kiln, whereby air heated therein is fed to and mingles with the ignited gas at or near its entrance into the kiln: bins or hoppers their upper ends flaring outwardly so as to fit in and be attached to the constructions forming said spaces in the bottom of the kiln for discharge, and extended downward so as to form narrower openings of regular form at their lower ends: covers or plates for the lower ends of said hoppers adapted to open and close their openings and to furnish a ledge around the outside of such ends upon which sand or other material may be placed for sealing the joint.

3. In a calcining and roasting kiln, a kiln supported above the floor so as to provide space beneath for discharge bins or hoppers, and provided with a charging flue placed above the entrance for the combustible gases: the down draft flues 20 and 28 provided with inlets for the waste gases and with means to deflect materials from entering the said inlets: radial plates extended horizontally from the bottom of the walls of said kiln to the wall of said central down draft flue, sub-dividing the annular open bottom of the kiln into convenient spaces for separate discharge: bins or hoppers their upper ends flaring outwardly so as to fit in and be attached to the constructions forming said spaces in the bottom of the kiln for discharge and extended downward so as to form narrower openings of regular form at their lower ends.

4. In a calcining and roasting kiln, a kiln supported above the floor so as to provide space beneath for discharge bins or hoppers, and provided with a charging flue placed above the entrance for the combustible gases:

a central down draft flue extended from the foundations up within the kiln proper about one-third its height and provided with inlets, and its lower end connected with and communicating through a horizontal flue to a stack: radial plates extended horizontally from the bottom of the walls of said kiln to the wall of said central down draft flue subdividing the annular open bottom of the kiln into convenient spaces for separate discharge: heating flues for air placed horizontally and radially at the bottom of the kiln and communicating with other flues or pipes with the gas entrance flue of the kiln, whereby air heated therein is fed to and mingles with the ignited gas at or near its entrance into the kiln: a heating flue space for air formed around said central down draft flue provided with openings for outside air near the flue, and communicating at its upper end with the horizontal heating flue: horizontal down draft flues placed radially at or near the bottom of the kiln, each provided with a series of inlets protected by deflecting covers and communicating with the central down draft flue: bins or hoppers their upper ends flaring outwardly so as to fit in and be attached to the construction forming said spaces in the bottom of the kiln for discharge, and extended downward so as to form narrower openings of regular form at their lower ends: covers or plates for the lower ends of said hoppers adapted to open and close their openings and to furnish a ledge around the outside of such ends upon which sand or other material may be placed for sealing the joint: and means to supply gas for combustion in the kiln.

5. In a calcining and roasting kiln, a kiln supported above the floor so as to provide space beneath for discharge bins or hoppers, and provided with a charging flue placed above the entrance for the combustible gases: the down draft flues 20 and 28 provided with inlets for the waste gases with means to deflect materials from entering the said inlets: radial plates extended horizontally from the bottom of the walls of said kiln to the wall of said central down draft flue, sub-dividing the annular open bottom of the kiln into convenient spaces for separate discharge: bins or hoppers their upper ends flaring outwardly so as to fit in and be attached to the constructions forming said spaces in the bottom of the kiln for discharge, and extended downward so as to form narrower openings of regular form at their lower ends: and means to supply gas for combustion in the kiln.

6. In a roasting and calcining kiln arranged for continuous operation, the down draft flue 20 extended from the foundations up within the kiln and provided with a deflector and inlets protected from the entrance therein of the material, and a horizontal flue connecting and communicating with the lower end of said flue and with an outside stack.

7. In a calcining and roasting kiln adapted for continuous operation and supported above the ground or floor: a frame work for such support consisting of a central column: iron columns for the outside walls, rims or plates on top of the iron columns for the walls of the kiln, and radial plates extended horizontally from the iron columns to the central columns, subdividing the bottom of the kiln into a series of discharge openings, all suitably secured.

8. In a calcining and roasting kiln, the series of columns, the rim secured to the columns, the radial plates attached to the said rim to subdivide the bottom of the kiln into a series of discharge openings, and the hoppers secured to the radial plates to register with the said openings, as set forth.

9. In a roasting and calcining kiln arranged for continuous operation, hoppers placed beneath the kiln to receive and discharge the calcined material, their lower ends terminating in a regular form and provided with a swinging cover or plate attached to the hoppers by rods pivoted thereto; the cover of such dimension as to furnish a ledge around the outside of said lower ends to hold sand or other material for sealing the joint.

In testimony whereof I hereunto subscribe my name, in the presence of two witnesses, this 24th day of August, 1893.

LUKE HOUZE.

Witnesses:
 LEOPOLD MAMBOURG,
 H. C. HARTMAN.